J. D. MOONEY.
SHAFT REVERSING MECHANISM.
APPLICATION FILED OCT. 5, 1906.

962,450.

Patented June 28, 1910.
2 SHEETS—SHEET 1.

Witnesses,
George Voelker
Hattie Smith

Inventor,
John D. Mooney
by Lothrop & Johnson
his Attorneys.

J. D. MOONEY.
SHAFT REVERSING MECHANISM.
APPLICATION FILED OCT. 5, 1906.
962,450.
Patented June 28, 1910.
2 SHEETS—SHEET 2.
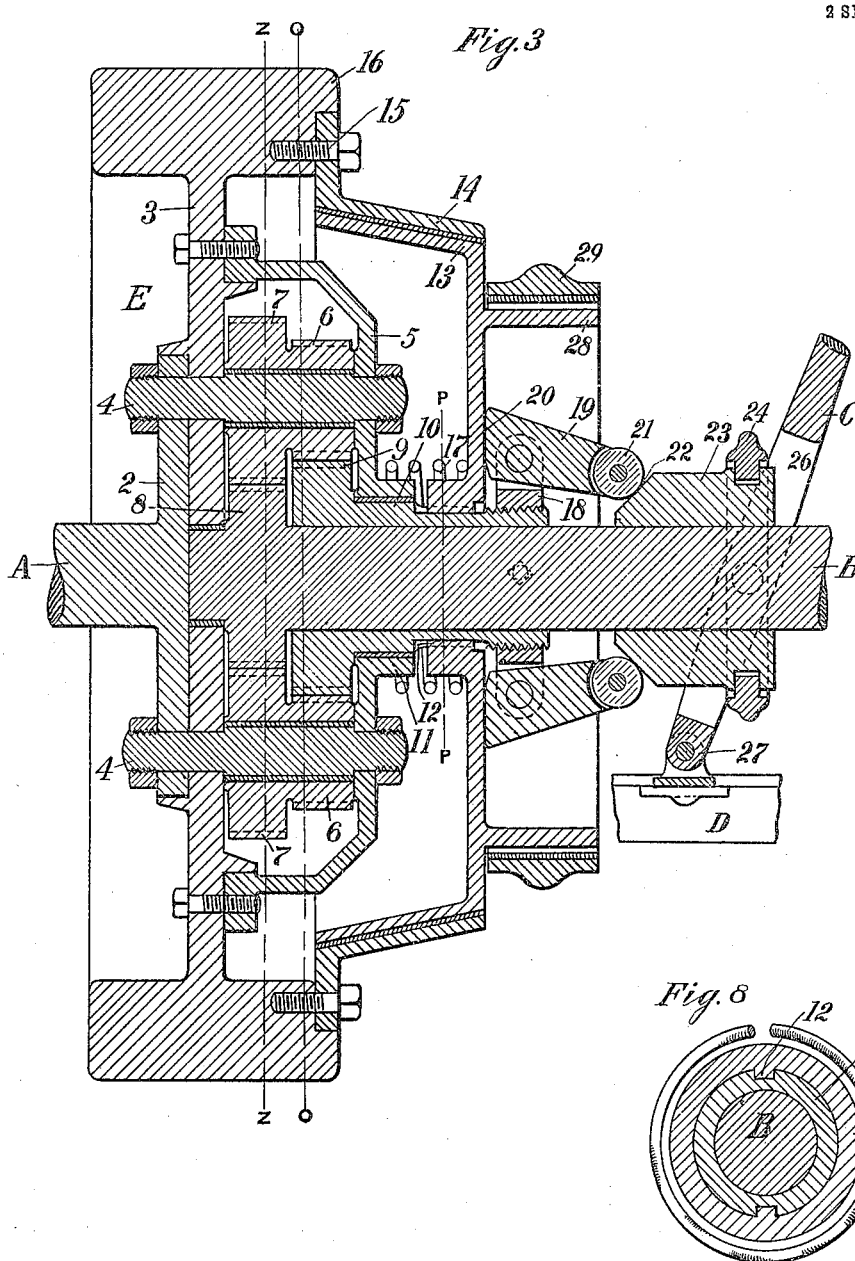
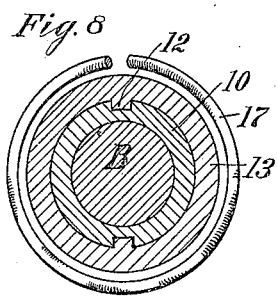
Witnesses,
George Voelker
Hattie Smith
Inventor,
John D. Mooney
by Lothrop & Johnson
his Attorneys.

UNITED STATES PATENT OFFICE.

JOHN D. MOONEY, OF ST. PAUL, MINNESOTA.

SHAFT-REVERSING MECHANISM.

962,450.

Specification of Letters Patent. Patented June 28, 1910.

Application filed October 5, 1906. Serial No. 337,557.

*To all whom it may concern:*

Be it known that I, JOHN D. MOONEY, a citizen of the United States, residing at St. Paul, in the county of Ramsey and State of Minnesota, have invented certain new and useful Improvements in Shaft-Reversing Mechanism, of which the following is a specification.

My invention relates to improvements in shaft reversing mechanism especially adapted for use in marine and automobile engines, and has for its object to provide improved means for reversing the direction of motion of the driven shaft without reversing the main shaft and balance wheel. To that end the invention consists in the construction, combination and arrangement of parts hereinafter described and claimed.

Figure 1:
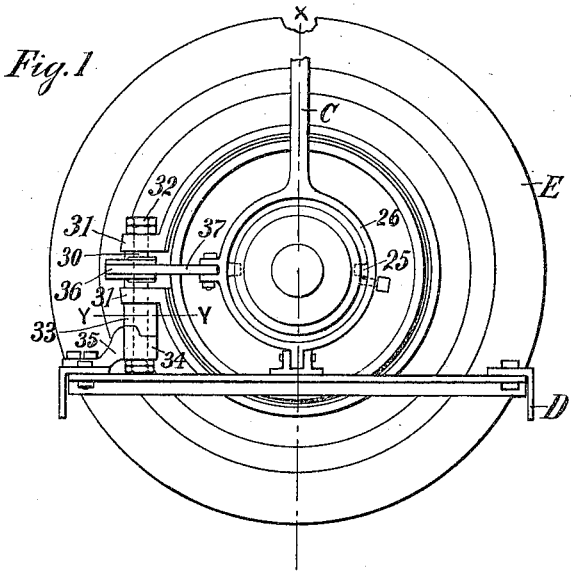
Figure 2:
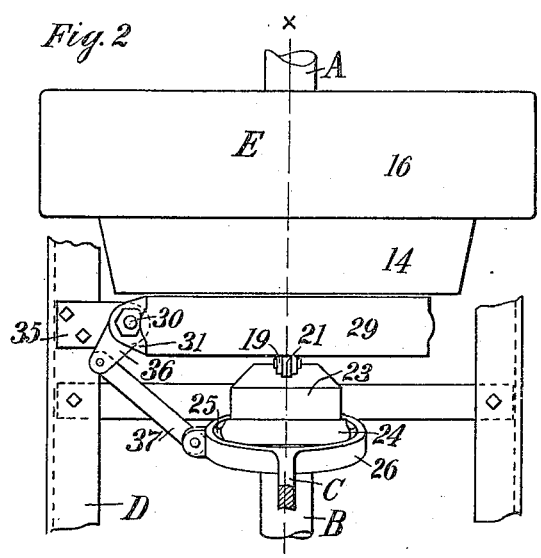
Figures 4, 5:
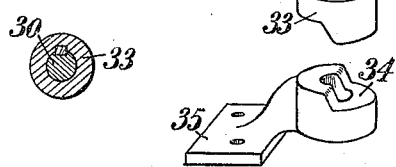
Figure 7:
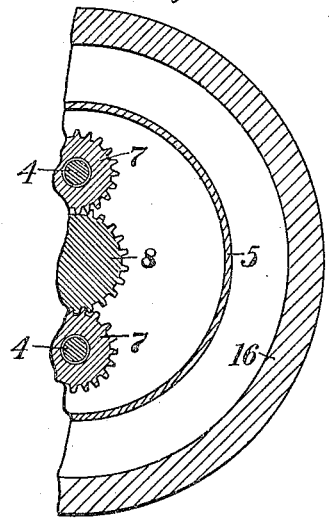
Figure 6:
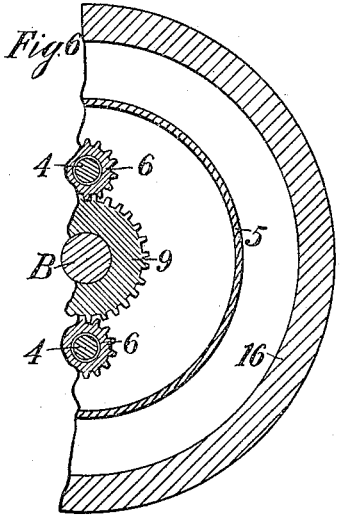

In the accompanying drawings forming part of this specification, Figure 1 is a front end view of the reversing mechanism and balance wheel; Fig. 2 is a top view thereof; Fig. 3 is a vertical section of the same on an enlarged scale on line $x$—$x$ of Fig. 1; Fig. 4 is a section through the pinch-collar-pin and cam-ring on line $y$—$y$ of Fig. 1; Fig. 5 is a perspective view of the two cam members detached; Figs. 6 and 7 are reduced vertical sections, partly broken away, on lines O—O and Z—Z, respectively, of Fig. 3, and Fig. 8 is a vertical section on line P—P of Fig. 3.

In the drawings A represents the main or drive shaft and E the balance wheel of an engine. The main shaft terminates in a flange or flanges 2 which are bolted upon the inner side of the web or arms 3 of the balance wheel by means of studs 4, which pass through the housing 5 secured upon the outer side of the web, and assist in securing the housing to the web. Journaled upon these studs within the housing are pairs of gears 6 and 7 integral with each other but of different diameters.

Centrally journaled in the web or hub of the balance wheel is a driven shaft B which passes loosely through the housing 5 and is formed near its inner end with a spur gear 8 which meshes with the larger gear 7 of each of the pairs of gears mentioned, the smaller gear 6 of each pair meshing at the same time with a gear 9 upon the sleeve 10, which fits over the driven shaft outside the gear 8. This sleeve is journaled in the flanged annular wall 11 of the central opening in the housing, and upon it is slidably secured, by feather 12, the drum-member 13 of a cone-clutch. The fixed member of the clutch consists of the reversely coned ring 14 secured by screws 15 upon the rim 16 of the balance wheel. The drum is held normally forced outward into engagement with the ring by means of a coil spring 17 interposed between the drum and the housing 5.

Secured upon the sleeve 10 outside the drum is a ring 18 in which are pivotally supported levers 19 having upon their inner ends cam faces 20 in position to bear against the outer face of the clutch-drum, and upon their outer ends rollers 21 in position to be engaged and forced apart by the beveled face 22 of a sliding plug 23 rotatably mounted upon the shaft. The plug is formed with an annular groove within which is an annular strap 24 pivotally supported upon lugs 25 upon the inner sides of the ring portion 26 of the clutch-lever C. This lever is pivotally supported at 27 upon the frame D.

Upon the outer face of the clutch-drum 13 is a cup 28. Passing loosely around the cup is a split ring or pinch collar 29 which may be tightened upon the cup to brake and check its revolution. The collar is supported upon a bolt or pin 30 which passes loosely through its flanged ends 31, these ends being held between a nut 32 upon one end of the pin and a cam ring 33 slidably feathered upon the pin on the other side. This ring has an inclined under face in position to engage and coöperate with a cam member 34 sleeved upon the pin and carried by a bracket 35 secured to the frame. Secured to the pin between the flanged ends of the brake ring is an arm 36 pivotally connected by a link 37 with the side of the clutch lever. Thus, when the clutch lever is thrown inwardly, the pin will be turned by the arm 36, so as to carry the cam ring 33 against the cam member 34. The ring will ride up on the cam member 34 and force the flanged ends of the pinch collar together, thus tightening the collar upon the cup 28.

In operation, when it is desired to turn the driven shaft B in the same direction as the main shaft and balance wheel, the parts will stand in the position shown in the drawings, with the clutch lever thrown out, and the clutch drum 13 forced by the spring 17 into frictional engagement with the ring 14 secured to the fly-wheel. The brake-ring 29 will also be sent out of engagement with the cup 28. With the parts in this position the clutch-drum 13 will be revolved with the balance wheel, and will carry with it the sleeve 10 to which it is feathered. The gears 6 and 7 mounted in the balance wheel will also be carried around with the wheel, and make the same number of revolutions as the wheel and the sleeve 10, but they will not revolve about their own axes. Thus, the drum, the sleeve, and the gears 6 and 7 will be carried around as a whole with the wheel, but will have no independent revolution of their own. The gear 7 meshing with the gear 8 upon the driven shaft, will carry the shaft around with it and with the balance wheel.

To reverse the direction of the driven shaft the clutch lever C is thrown inwardly, thereby, through the medium of the strap 24, driving the plug 23 against and between the rollers 21 and forcing them apart. As the outer ends of the levers 19 are spread apart, their inner ends will be forced toward each other, and their cam faces 20 bearing against the outer end of the clutch drum 13 will force the drum inwardly out of engagement with the ring 14 and out of operative connection with the balance wheel. At the same time the clutch-lever, acting through the link 37 and arm 36, will turn the pin 30 and cause the brake collar 29 to be tightened against the cup 28, thus checking the forward rotation of the drum 13 and its connected sleeve 10, and holding the sleeve stationary. Thus the fly wheel will be disconnected from all the rotary parts except the differential gears 6 and 7. These gears are carried around by the wheel and mesh, respectively, with the gear 9 on the sleeve and 8 upon the driven shaft. Being caused by the now stationary gear 9 on the sleeve to revolve in the same direction as the main shaft and fly wheel, and the gear 7 which meshes with the shaft-gear being of greater diameter than the gear 6 which meshes with the sleeve-gear, they will turn the driven shaft in the opposite direction. The relative speed of revolution of the driven shaft will depend upon the difference in size between the gears 6 and 7.

I do not wish to limit myself to the particular style of clutch used or mechanism shown, for it is obvious that changes may be made in the details of construction without departing from the principle of the invention the scope of which is defined in the claim.

I claim as my invention:

Transmission mechanism comprising a driving shaft having a circular flange at its end, a balance wheel bolted to said circular flange, integral gears of different sizes mounted on said bolts, a surrounding casing bolted to said balance wheel and having openings within which said first named bolts are supported, a driven shaft having an integral gear near its end and adapted to mesh with the larger members of said integrally formed gears, a sleeve rotatably mounted on said driven shaft, a gear formed integral with said sleeve, a frusto-conical flange bolted to said balance wheel and having an inner friction surface, a complemental conical member having an outer friction surface and splined on said sleeve, a spring for normally forcing said complemental member into contact with said cone, a ring threaded on said sleeve, cam levers pivoted on said ring, and contacting with said conical member, a cone for operating said lever to force said conical member out of clutching position against the tension of said spring, said conical member having an integral circular flange, a split band on said flange, and lever mechanism for shifting said cone to disengage the clutch and simultaneously tightening said band to brake said conical member and thereby hold said sleeve stationary.

In testimony whereof I affix my signature in presence of two witnesses.

JOHN D. MOONEY.

Witnesses:
ARTHUR P. LOTHROP,
HATTIE SMITH.